US005105309A

United States Patent [19]

Baravaglio et al.

[11] Patent Number: 5,105,309

[45] Date of Patent: Apr. 14, 1992

[54] SIGNALLING BATON

[76] Inventors: Christian Baravaglio, 5, Rue des Lacs, 91350 Grigny 2; Jean-François Ducommun, Domaine de Louvenance 49, Promenade du Levant, 83120 Sainte-Maxime, both of France

[21] Appl. No.: 609,994

[22] Filed: Nov. 7, 1990

[30] Foreign Application Priority Data

Nov. 27, 1989 [FR] France ................................ 89 15580
May 4, 1990 [FR] France ................................ 90 05643

[51] Int. Cl.[5] ......................... G02B 5/124; A45B 3/02

[52] U.S. Cl. .................................... 359/530; 359/515; 362/102

[58] Field of Search .................................... 350/97-98, 350/102, 286, 287; 362/102, 109, 191, 202, 101; 446/219

[56] References Cited

U.S. PATENT DOCUMENTS 2,561,228 7/1951 Richey .................................. 350/97
4,600,974 7/1986 Lew et al. ........................... 362/102
4,967,321 10/1990 Cimock ............................... 362/101
5,039,200 8/1991 Michler .............................. 359/517

*Primary Examiner*—Bruce Y. Arnold
*Assistant Examiner*—James Phan
*Attorney, Agent, or Firm*—Darby & Darby

[57] ABSTRACT

The signalling baton consists of a cylindrical tube made of unbreakable transparent material and sealingly closed at its ends by a handle and a plug. this tube contains a plurality of reflectors arranged in the form of a prism and retained between the handle and the plug.

8 Claims, 2 Drawing Sheets

Fig. 1
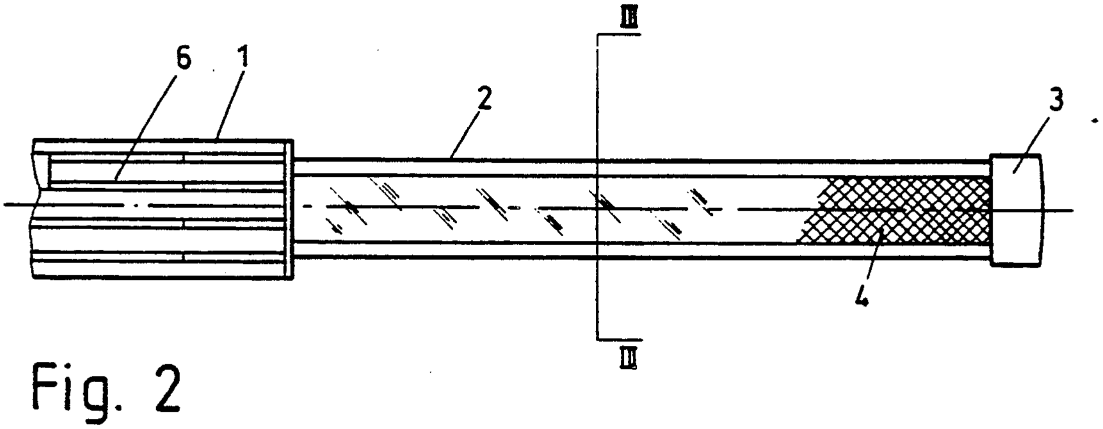
Fig. 2
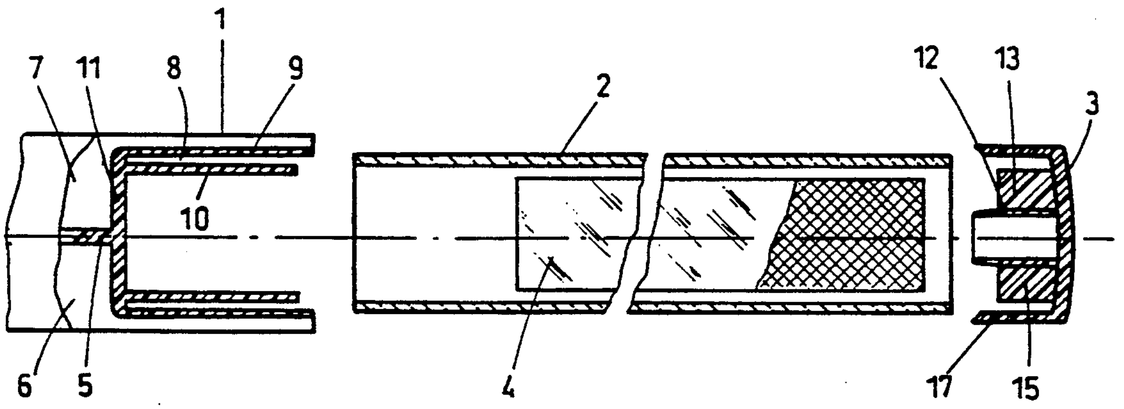
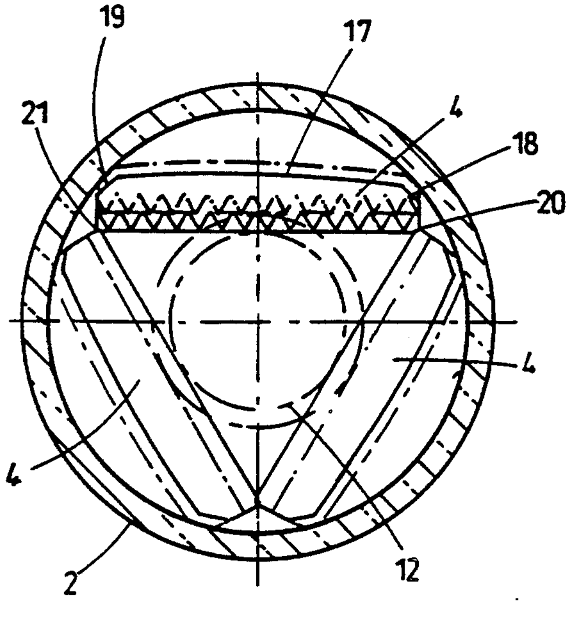
Fig. 3
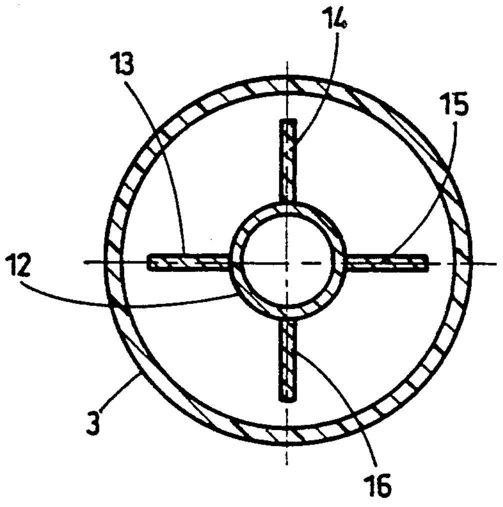
Fig. 4

SIGNALLING BATON

The present invention relates to a signalling baton comprising a closed cylindrical tube made of at least partially transparent material and provided with a handle.

The white batons used by the police are well known. The visibility of such batons is ensured only by their white colour and this visibility is poor. Illuminated batons comprising a transparent cylindrical tube housing an electric light source are also known. These signalling batons require one or more batteries. These batons are fragile, use a lot of power and are relatively expensive.

The object of the present invention is to provide a signalling baton which does not use a source of electrical power and is strong, cheap and clearly visible under normal conditions of use.

The signalling baton according to the invention is characterized in that the cylindrical tube, made of unbreakable synthetic material, contains reflectors, likewise made of synthetic material, arranged so as to form a prism, the sealed casing of which consists of the cylindrical tube.

Reflectors and their reflective property have been well known for a number of years. Until now, however, their use has been limited to signalling the backs of vehicles, signalling roadsides and signalling pedestrians or cyclists by the wearing of belts or armbands provided with reflectors. The reflector has thus become a very common object which everyone can see every day and at almost any time. In spite of this, no one has ever thought, until now, of using reflectors to produce a signalling baton.

Furthermore, for a reflector to perform its function, it is necessary for its toothed face to be protected against dust and moisture. To this end, the toothed rear face of the reflectors is generally covered with a small plastic plate adhesively bonded over the periphery of the reflector.

The mounting of reflectors, arranged in the form of prisms, in a sealingly closed, transparent plastic tube makes it possible to fulfil the above mentioned operating conditions in a very simple manner without the need to provide the toothed face of the reflectors with a sealed cover. The measured reflectivity is surprising and the baton performs its signalling function in virtually any position. In addition, by rotating the baton about its axis it is possible to obtain a flashing effect, which increases the warning effect.

According to an alternative embodiment, the transparent plastic tube may be provided with phosphorescent material judiciously arranged in such a way that the baton is visible in total darkness. The phosphorescent material is preferably arranged in strips which extend along the tube facing the edges of the prism formed by the reflectors.

According to a preferred embodiment of the invention, the transparent tube is closed at its ends, on the one hand, by the handle, and, on the other hand, by a cap, the tube being firmly fixed simply by fitting into these two parts which ensure a sealed closure of the tube. The reflectors are simply retained axially between the handle and the cap. In the case where the tube has phosphorescent strips, the reflectors are positioned angularly by an inner projection. A single projection is sufficient. The constituent parts of the baton may be assembled mechanically, making it possible to achieve a very low cost price. Consequently, such a signalling baton would be affordable to everyone.

It has additionally been found that the signalling baton according to the invention may be readily used in daylight, in particular in sunlight. The materials constituting these various components may be particularly resistant plastic materials, in such a way that the baton is virtually unbreakable.

The accompanying drawing shows, by way of example, on embodiment of the invention.

FIG. 1 is a general view of the signalling baton.

FIG. 2 is an enlarged view, exploded and partially in section, of this baton.

FIG. 3 is a cross-section along III—III of FIG. 1, to a larger scale.

FIG. 4 is an axial view of the cap, to a smaller scale than FIG. 3.

Figures 5, 6:
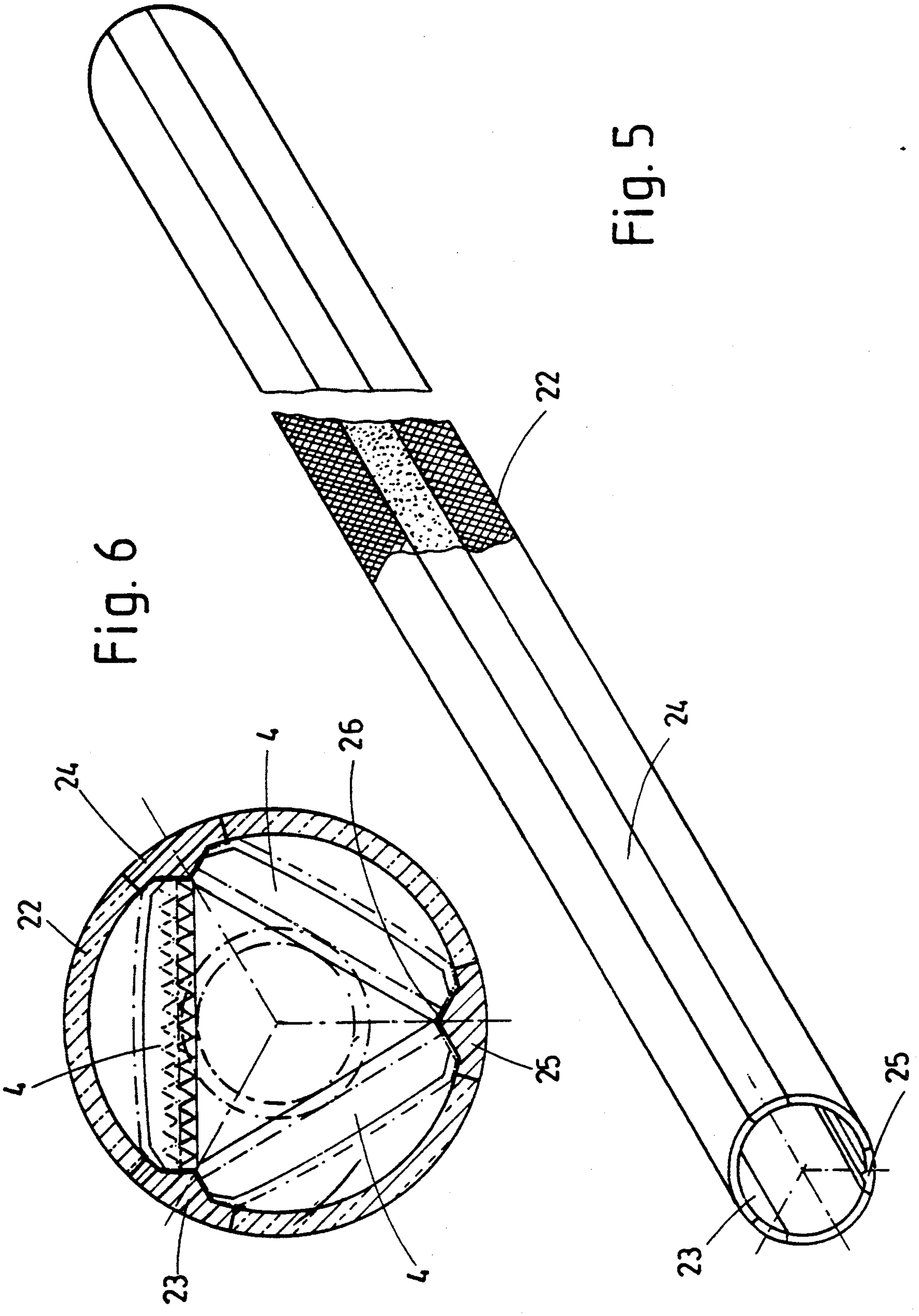
FIG. 5 is a perspective view of the body of the baton according to a second embodiment.
FIG. 6 is a sectional view of the baton according to the second embodiment.

The signalling baton shown in FIG. 1 consists of a handle 1 in which is slotted a transparent cylindrical tube 2 closed at its end by a cap 3 and containing three reflectors 4. All these elements are made of impact-resistant plastic material. The tube 2 is made, for example, of impact PMMA polymethylmethacrylate, as are the reflectors.

The handle 1 is of triangular cross-section. It is of lightweight structure, consisting of a relatively thin core 5 on each side of which there extend parallel ribs 6 and 7. On the tube 2 side, the handle has an annular housing 8 formed between two cylindrical walls 9 an 10 closed on one side by a transverse wall 11. The distance between the walls 9 and 10 is equal to the thickness of the wall of the tube 2, in such a way that it is possible to force the tube into the housing 8. The cap 3 has a cylindrical skirt 17, the inside diameter of which is such that the tube 2 may be forced into this skirt. The cap 3 has a tubular central core 12, the end of which is frustoconical, the largest diameter of this frustoconical part being at least equal to the diameter of the circle inscribed in the prism formed by the reflectors 4, in such a way that, when this frustoconical core is introduced into the prism formed by the reflectors, it separates these reflectors slightly by pressing their edges against the inner wall of the tube 2. The centring core 12 is additionally provided with four radial ribs 13, 14, 15 and 16 which extend in a circle, the diameter of which is slightly smaller than the inside diameter of the tube 2.

The three reflectors 4 are in the form of rectangular strips, the smooth outer face 17 of which is slightly domed (FIG. 3). The edges of this smooth face are chamfered in accordance with a radius equal to the inside radius of the tube 2 so as to have cylindrical facets 18 and 19. The inner edges 20 and 21 of the small plates are chamfered so as to form an angle of 120° between them. The dimensions of the reflectors are such that they may be introduced freely, with a large clearance, into the tube 2. They are introduced together and come to bear against one another by their chamfered edges, as shown in FIG. 3, in such a way that they may be displaced slightly relative to one another while maintaining a position which permits the introduction of the frustoconical core 12 between the reflectors when positioning the cap 3 which is pressed into the tube with force. The conicity of the core 12 has the effect of symmetrically and radially separating the reflectors which come to rest by their cylindrical facets 18 and 19 against the inner wall of the tube 2, as shown in dot-and-dash lines. The ribs 13 to 16 abut against the ends of the reflectors, in such a way that the latter are perfectly retained both axially and angularly.

Measurements showed that the reflectors had a very high reflectivity. For an angle of divergence of 20' and an angle of illumination of 0°, reflections of 930 and 1010 mcd/lux were measured. These values are very high, considering that the values required for European approval for the various known types of reflectors are respectively 300 mcd/lux for a rear reflector for vehicles, 300 mcd/lux for a bicycle pedal reflector and 20 mcd/lux for a belt or armband reflector.

The baton described above requires only a very small amount of light to be perfectly visible but, in total darkness, it is not visible. However, it is possible to produce a baton which is visible in total darkness without modifying the construction of the baton by adding phosphorescent material thereto. The phosphorescent material must not, however, interfere with the functioning of the reflectors. One embodiment is shown in part in FIGS. 5 and 6.

The completely transparent tube 2 of the first embodiment is replaced by a tube 22 provided with three strips 23, 24, 25 made of phosphorescent material extending along generatrices of the tube 22 and distributed regularly around the tube 22. For a tube diameter of 25 mm, the width of the strips is 8 mm. Between the strips 23, 24, 25, the tube 22 is transparent, of course. The tube 22 with its phosphorescent strips 23, 24, 25 may be made from the same material as the tube 2. It is obtained by die extrusion and the strips 23, 24, 25 are inserted in the thickness of the tube during extrusion.

At least one of the phosphorescent strips has an inner median projection 26 in the form of a dihedron, over its entire length, for the automatic angular positioning of the reflectors 4, in such a manner that the edges of the prism formed by the reflectors are in the centre of the phosphorescent strips. The active faces of the reflectors are therefore facing a transparent part of the tube and the phosphorescent strips hardly reduce the effect of the reflectors at all. The cap 3 could also be phosphorescent. In other respects, this second embodiment is similar to the first embodiment.

When the baton is used at night on the road, for example, it is firstly illuminated by the reflectors owing to the effect of the light from car headlights. After turning off the headlights, the baton is illuminated by its phosphorescent strips, the phosphorus of which has been excited by the light from the headlights.

The invention is, of course, not limited to the embodiments described above. In particular, the number of reflectors, that is to say of strips, could be greater than 3. The tube could be closed in another manner, for example by adhesive bonding or welding. The cap 3 could be replaced by a plug surrounded by the tube. The handle could be made in one piece with the tube or fixed or formed on the tube by any known means, for example by overmoulding.

We claim:

1. A signalling baton comprising a closed cylindrical tube (2; 22) made of transparent material and provided with a handle (1), wherein the cylindrical tube (2; 22) is made of unbreakable synthetic material and contains reflectors (4) which are made of synthetic material, wherein the reflectors are arranged so as to form a prism, and wherein said cylindrical tube forms a sealing casing.

2. Signalling baton according to claim 1, wherein the tube (22) includes phosphorescent strips (23, 24, 25) which extend along the tube facing the edges of the prism formed by the reflectors.

3. Signalling baton according to claim 2, wherein the tube has, in the centre of at least one of the phosphorescent strips (25), an internal projection (26) which extends over at least part of the length of the tube, for the angular positioning of the reflectors.

4. Signalling baton according to claim 1, wherein the tube (2; 22) is sealingly closed at its ends exclusively by axial force fitting, on the one hand, into the handle (1) and, on the other hand, into or around a plug (3), the reflectors being retained axially between the handle and the plug.

5. Signalling baton according to claim 4, wherein the plug (3) is in the form of a cap provided with a frustoconical centring core (12) which is engaged between the reflectors and the conicity of which is such that, once introduced into the prism formed by the reflectors, it keeps the edges of the reflectors pressed against the wall of the tube, with a certain pressure.

6. Signalling baton according to claim 5, wherein the tube (2; 22) is fitted into an annular cylindrical housing (8) of the handle with a thickness equal to the thickness of the tube, and in that the core (12) of the cap is provided with radial ribs (13 to 16) which retain the reflectors axially.

7. Signalling baton according to claim 1, wherein the reflectors are in the form of small rectangular plates, the outwardly directed face (17) of which is slightly domed.

8. Signalling baton according to claim 7, the longitudinal edges of the domed face of the reflectors have cylindrical-shaped bearing facets (18, 19), the radius of which is equal to the internal radius of the tube (2), and in that the longitudinal edges of the inner faces of the reflectors are provided with a chamfer by which the reflectors are able to bear against one another.

* * * * *